Jan. 6, 1942.   F. M. SALISBURY   2,268,849
METHOD OF UNITING MATERIALS
Filed Sept. 30, 1939   2 Sheets-Sheet 2
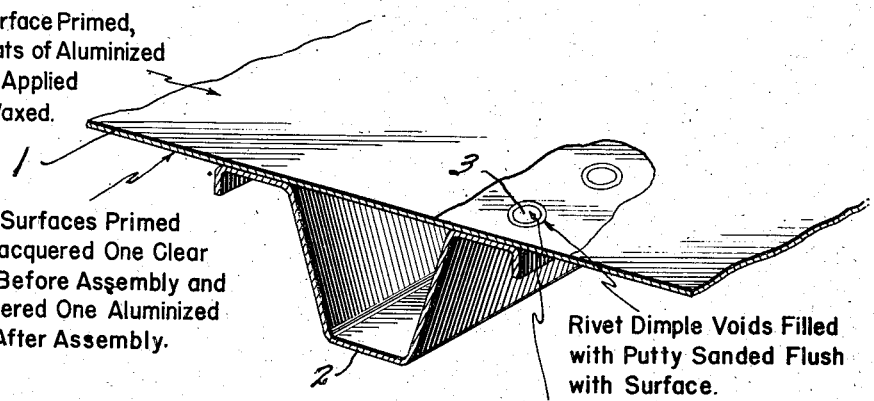
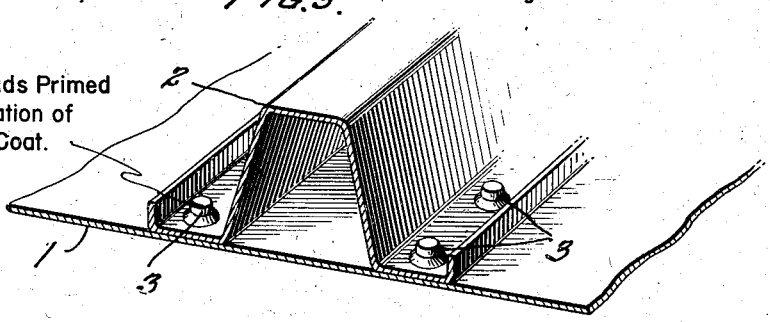
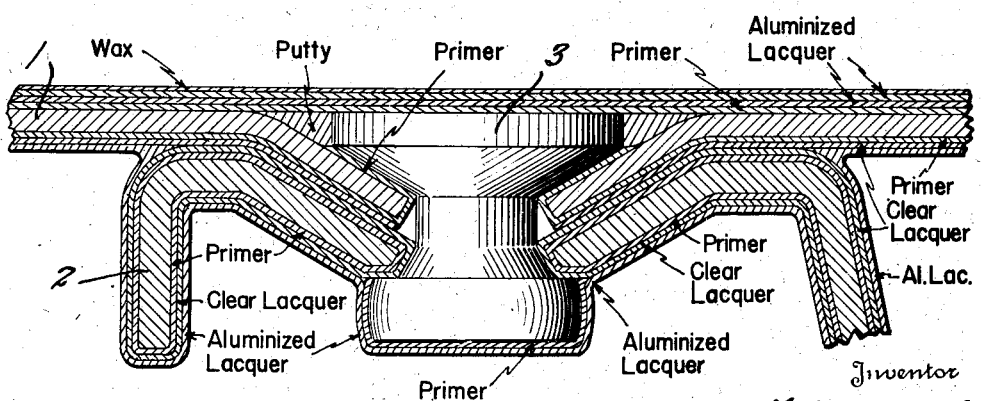

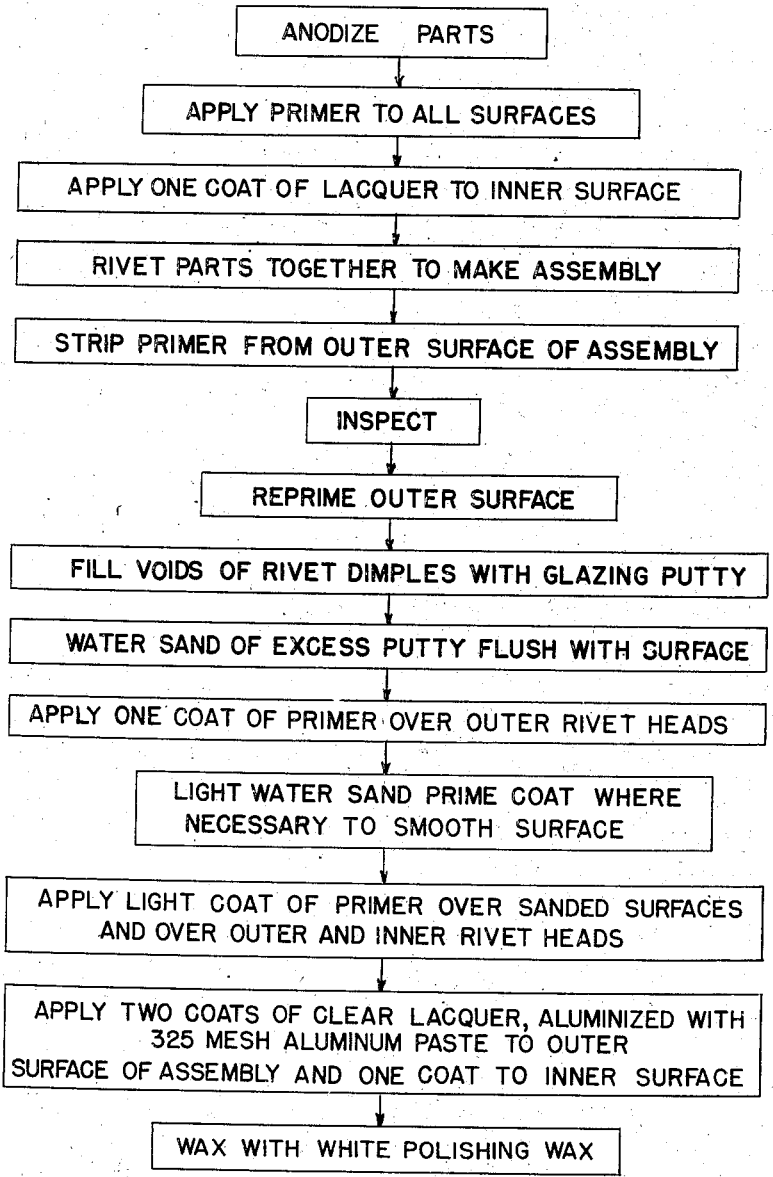

Patented Jan. 6, 1942

2,268,849

UNITED STATES PATENT OFFICE 2,268,849

METHOD OF UNITING MATERIALS

Frank M. Salisbury, Kenmore, N. Y., assignor to Bell Aircraft Corporation, Buffalo, N. Y., a corporation of New York Application September 30, 1939, Serial No. 297,409

4 Claims. (Cl. 113—116)

Generically the present invention relates to means for uniting structural members and specifically has reference to a riveting joint and a process for flush riveting structural members that are subjected to aero-dynamic and hydrodynamic forces. Although my invention finds particular application in the fabrication of aircraft it is of course of greater scope and can be employed with excellent results in joining any thin sheet metal members.

In view of the fact that aluminum alloys such as for instance duralumin are being used as structural materials for aircraft it has been found that riveting is by far the best method by which to join the members. Moreover since the development of the dimpled or recessed rivet this joint has been very extensively used in aircraft manufacture.

An object of the present invention is to provide a method by which a much smoother surface is obtained over a dimpled rivet joint.

Another object of the present invention is to provide a method for uniting structural members of aircraft which will afford a joint that has a good appearance, which is easy to clean and which will minimize drag.

Yet a further object of the present invention is to provide a novel flush riveted joint that is easy to manufacture, positive in operation and which will not detract from the exterior appearance of the material which has been united.

To achieve the above and other objects this invention in general embraces the idea of covering all surfaces of the members being joined with what we may term a protective coating before the primary structural member is riveted to its support. After the parts have been riveted the voids of the dimple are filled with putty so that the exterior surface of the members joined will form a continuous flush contour structural material. Of course the head of the rivet and any portions of the primary structural material which may be rough are smoothed off and both the primary structural material and the support are coated with an aluminum lacquer. Lastly the materials are covered with a polishing wax or the like.

A structural member of an airplane, for example a wing processed according to this invention, will present an excellent external appearance and be quite easy to clean. In addition drag will be greatly minimized and the wing will not be materially effected by adverse weather conditions. By initially coating the parts before fabrication, electrolitic action between the parts, for instance the rivet head and the dimple, is eliminated, producing a more permanent structure.

In the drawings:

Figure 1 is a flow sheet showing one method of carrying out my inventive concept.

Figure 2 is a fragmental view in perspective showing the manner in which the upper surface of the rivet head is made flush with the primary structural member or skin.

Figure 3 is a fragmental view in perspective illustrating the character of the inner rivet head and the manner in which it is attached to the support member or stringer.

Figure 4 is an enlarged sectional view illustrating the manner in which the primary structural member, the stringer and the rivet appear after they have been subjected to my novel process.

In the specification the words primary structural member and support member are used to designate the skin of the wings, tail surfaces, fusilage or the like and the stringers, support beams and so forth respectively.

With reference to Figure 1 wherein is illustrated my process it can be seen that I first anodize both the primary structural member and its support. A primer of any suitable character is then applied to all surfaces of both the members. The inner surface of both the primary structural member and the support are coated with one coat of lacquer.

For a more adequate comprehension of my process attention is called to Figures 2 to 4 inclusive, wherein I have designated the primary structural member with the numeral 1, the support member 2, and the rivet 3. After the inner parts have been coated with lacquer the rivet is positioned in the dimple provided in the members 1 and 2 and these parts are riveted together. It can be seen from Figure 4 that a non-metallic coating is between all joined surfaces. The arrangement will prevent electrolitic action between the joined members and thus produce a more satisfactory construction.

After the two parts have been riveted together the primer coating on the outside surface is then removed and the joint is inspected for imperfections and so forth.

The outer surface is again coated with a primer such as mentioned in the second phase of the process and the voids of the rivet dimples (see Figure 4) are filled with a glazing putty. The excess putty is then removed by water sanding so that the filled voids will be flush with the surface of the primary structural members.

One coat of a primer is then applied to the outer rivet heads and if necessary the surface may be smoothed by light water sanding. Next a light coat of primer is coated over the sanded surfaces and over the inside and outside rivet heads.

The outer surface of the primary structural member is then coated with two coats of a clear lacquer which is aluminized with 325 mesh aluminum paste and one coat of this lacquer is applied to the surface of the support member 2. Lastly the outer surface of the primary structural member 1 is coated with white polishing wax or the like.

It is believed to be readily apparent from the above description that I have provided a flush rivet joint for structural members which presents an excellent outward appearance and which is easy to clean. In addition the unit is well protected from any adverse weather conditions which may be encountered and should find particular application in the construction of pontoons, gasolene tanks and the like. Moreover, a joint made according to this invention presents a very smooth external surface which will of course materially reduce drag.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. A method of joining structural materials which includes the following steps, forming a dimple in the surface of each of the materials to be joined, anodizing the materials, applying a primer coating to all surfaces of the materials, applying a coating of lacquer on the inside surfaces of said materials, positioning a rivet in the dimple on top of the coating so that the upper surfaces of the head of the rivet will be substantially flush with the surface of the material, filling the voids of the dimple with putty.

2. In a method of attaching an airplane surface to a supporting member with the so-called flush rivet, forming a dimple in the structural material and the support member, applying a primer coating to all the surfaces of the structural material and support member, applying a coating of lacquer to the inner surface, positioning a rivet within the dimple on top of the coating so that the upper surface of the head of the rivet is substantially flush with the surface of the structural material, removing the primer coating from the outer surfaces, coating the outer surfaces with a primer, filling the voids of the dimple with glazing putty, coating the surfaces with aluminized lacquer, waxing the surfaces.

3. A method of uniting sheet metal surfaces comprising forming dimples in each sheet adapted to lie over each other, applying a priming coating to the surface, swaging a rivet in place with its head in the upper dimple and lying against the priming coating in the dimple and having the upper surface of the rivet head flush with the upper surface, and then coating the upper head of the rivet and the upper surface so that the coating lies even and unbroken over the rivet head and the upper surface so as to form a construction that is clean aero-dynamically.

4. A method of joining structural materials comprising forming a dimple in the surface of each of the materials, coating the surfaces of the materials including the dimple, positioning a rivet within the dimple on the top of the coating so that the upper surface of the head of the dimple is substantially flush with the surface of the material, and filling the voids of dimple with putty.

FRANK M. SALISBURY.